UNITED STATES PATENT OFFICE.

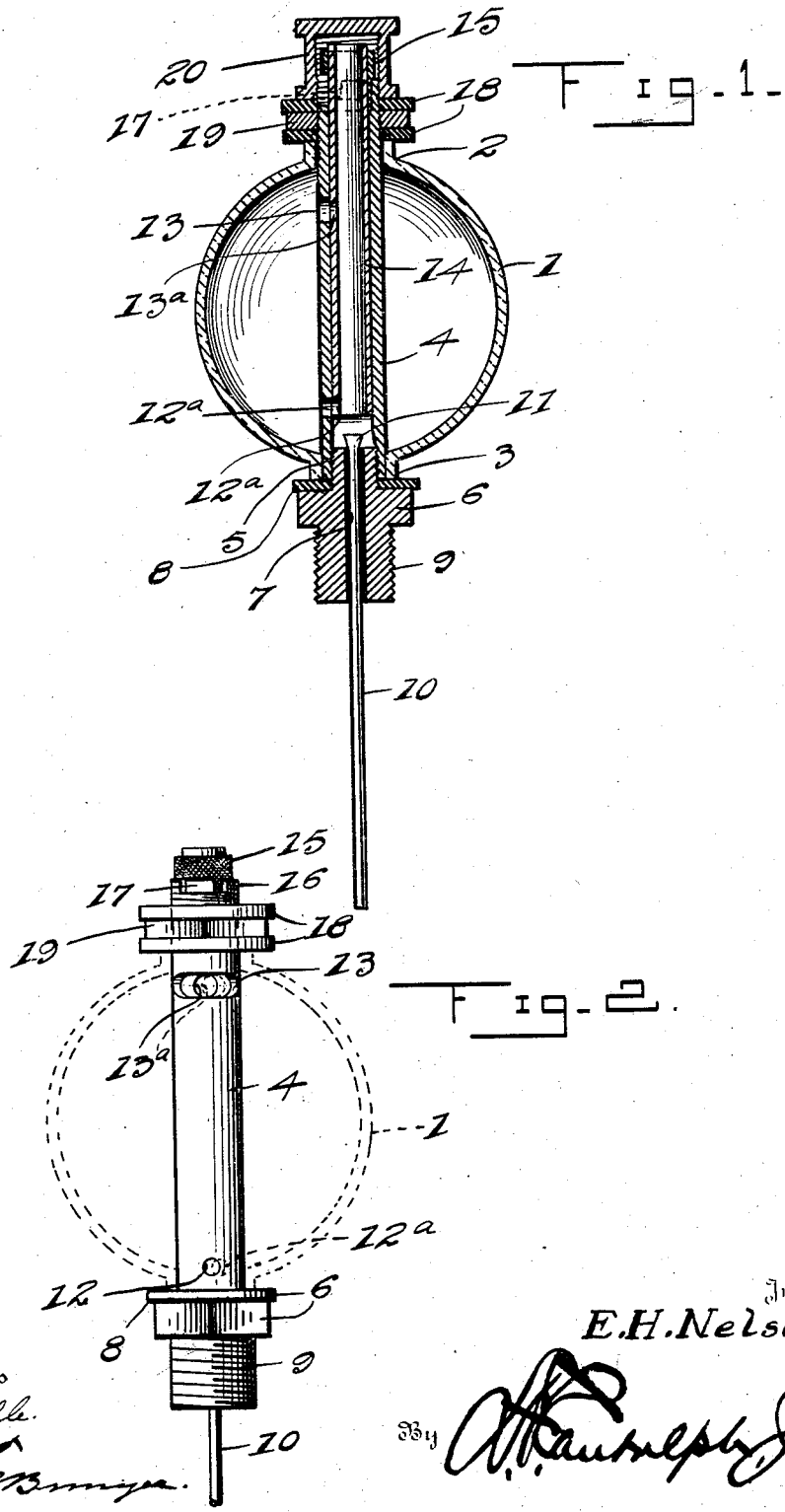

EDWARD H. NELSON, OF GALESBURG, ILLINOIS.

AUTOMATIC LUBRICATING DEVICE.

1,162,873.

Specification of Letters Patent. Patented Dec. 7, 1915.

Application filed December 12, 1914. Serial No. 876,877.

*To all whom it may concern:*

Be it known that I, EDWARD H. NELSON, a citizen of the United States, residing at Galesburg, in the county of Knox and State of Illinois, have invented certain new and useful Improvements in Automatic Lubricating Devices; and I do hereby declare the following to be a full, clear, and exact description of the invention, such as will enable others skilled in the art to which it appertains to make and use the same.

This invention relates to automatic lubricating devices, and one of the principal objects of the invention is to provide a lubricating cup adapted to be secured to any part of a machine and having a pin or plunger mounted in the cup in such manner that when it is vibrated by the movement of the machine, the lubricant will be fed down the outer side of the plunger or pin and applied to the shaft or other bearing.

Another object of the invention is to provide an oil cup with a plunger or pin of smaller diameter than the bore in which it fits to feed oil by vibration or jarring of the mechanism to which it is applied for feeding oil to a bearing.

The foregoing or other objects may be attained by means of the construction illustrated in the accompanying drawing, in which, Figure 1 is a vertical section through a lubricating device made in accordance with this invention, Fig. 2 is a side elevation of the same showing the oil cup in dotted lines.

Referring to the drawing, the numeral 1 designates an oil container which may be made of glass or other suitable material and having its upper and lower ends opened and provided with an annular flange 2 at its upper side and a similar flange 3 at its lower end. Fitted in the openings in the oil container 1 is a tube 4, said tube having at its lower end interior screw threads 5 to fit a threaded plug 6, said plug having an oil duct 7 therein, and being fitted to the oil container 1 by means of a rubber gasket 8 and also provided with screw threads 9 for attachment to any part of a machine at the bearing of a shaft. A plunger 10 passes through the oil duct 7, and is smaller in diameter than said ducts, and is provided with a flattened upper end 11. The tube 4 is provided with a feeding opening 12 for the oil, near its lower end and a slot 13 near its upper end inside the container 1.

A tube 14 is fitted in the tube 4 and said tube 14 is provided with a perforation or oil duct 12ª at its lower end. The inner tube 14 is mounted to rotate within the tube 4, and at its upper end is provided with a knurled head 15, said head being provided with a downwardly extending stop lug 16. The lug 16 is mounted in a recess or slot 17 in the upper end of the tube 4. The tube 4 is secured to the container 1 at its upper end by means of washers 18 and a gasket 19. A cap 20 is fitted to the upper end of the tube 4 and serves to compress the washers and gaskets to make a tight joint at the top of the container 1.

In order to fill the oil container 1, the cap 20 is removed and the inner tube 14 is rotated by means of the knurled head 15 to bring the opening 13 in the outer tube coincident with the opening 13ª in the inner tube. Oil then being admitted through the inner tube and through the perforations 13 and 13ª to the container 1. The lug 16 is for the purpose of regulating the openings 12 and 12ª, one relatively to the other to indicate the desired quantity of oil to be fed to the pin or plunger 10, the lug 16 being in alinement with the opening 12ª to indicate its position and the positions of the openings 12 and 12ª.

When the device is secured to a machine at a bearing for a shaft, the movement of the shaft or machine will jar the lubricator sufficiently to permit oil to be fed through the ducts 12 and 12ª to the pin 10 and will thus convey the oil to the shaft or bearing. It will be understood that the openings 13 and 13ª are closed during the operation of the device, and it will also be obvious that the pin 10 when the machine stops operating will not be jarred or vibrated to feed the oil, and that the quantity of lubricant to be fed may be regulated by means of the lug 16 and the openings 12 and 12ª.

Various changes may be made in the details of construction without departing from the spirit and scope of the invention as defined in the claims.

What is claimed is:—

1. A lubricator comprising an oil container, a tube fitted in said container and provided with an oil duct, an interior tube fitted in the first mentioned tube and provided with an oil duct or opening, a plug fitted in the container and having a bore therein, a pin mounted to vibrate in said plug, means for filling said oil container through said inner tube and outer tube, and means for regulating the quantity of lubricant to be fed through the oil duct.

2. A lubricating device comprising an oil container, a plug fitted in the lower end of said container and provided with a bore, and a feeding pin or plunger mounted in the bore and being of smaller diameter than said bore, and a tube extending through the container and provided with a rotary inner tube having openings for filling the oil container and for feeding the oil to said pin, a lug on said inner tube, a recess formed in the outer tube, and means for turning the inner tube relatively to the outer tube to fill the container and to regulate the flow of oil from the container to said pin or plunger.

In testimony whereof I affix my signature in presence of two witnesses.

EDWARD H. NELSON.

Witnesses:
RICHARD G. HAYM,
GLEN S. PECKENPAUGH.

Copies of this patent may be obtained for five cents each, by addressing the "Commissioner of Patents, Washington, D. C."